United States Patent
Wang et al.

(10) Patent No.: US 7,376,636 B1
(45) Date of Patent: May 20, 2008

(54) GEOCODING USING A RELATIONAL DATABASE

(75) Inventors: Ping Wang, Stanford, CA (US); Jayant Sharma, Nashua, NH (US); Liujian Qian, Lancaster, MA (US)

(73) Assignee: Oracle International Corporation, Redwood Shores, CA (US)

( * ) Notice: Subject to any disclaimer, the term of this patent is extended or adjusted under 35 U.S.C. 154(b) by 269 days.

(21) Appl. No.: 10/165,811

(22) Filed: Jun. 7, 2002

(51) Int. Cl.
*G06F 17/30* (2006.01)

(52) U.S. Cl. .................. 707/1; 707/6; 707/102; 707/200; 706/45; 701/208

(58) Field of Classification Search .......... 707/1–10, 707/100–104.1, 200–206; 701/4, 206–209, 701/213–215; 706/45
See application file for complete search history.

(56) References Cited

U.S. PATENT DOCUMENTS

| | | | | |
|---|---|---|---|---|
| 6,161,105 | A * | 12/2000 | Keighan et al. | 707/100 |
| 6,381,605 | B1 * | 4/2002 | Kothuri et al. | 707/100 |
| 6,505,205 | B1 * | 1/2003 | Kothuri et al. | 707/100 |
| 6,594,666 | B1 * | 7/2003 | Biswas et al. | 707/100 |
| 6,732,120 | B1 * | 5/2004 | Du | 707/104.1 |
| 6,920,446 | B1 * | 7/2005 | Wang et al. | 707/2 |
| 6,950,828 | B2 * | 9/2005 | Shaw et al. | 707/103 R |
| 6,954,764 | B2 * | 10/2005 | Biswas et al. | 707/104.1 |
| 7,039,640 | B2 * | 5/2006 | Miller et al. | 707/10 |
| 2002/0124015 | A1 * | 9/2002 | Cardno et al. | 707/204 |

OTHER PUBLICATIONS

Mario R. Sanchez et al., Semantic Database for Geographic Information Systems, 1996, IEEE, 696-698.*
Masatoshi Arikawa et al., Spatial Media Fusion Project, 2001, IEEE, 304-311.*
GeoZip [online], 2001 [retrieved on Feb. 4, 2002]. Retrieved from the Internet <URL: http://www.whereonearth.com/geozip>.
"Oracle® interMedia Locator User's Guide and Reference (Release 8.1.6)," Oracle Corporation (1999, 2000).
Oracle Spatial User's Guide and Reference (Release 8.1.6) [online], 1999 [retrieved on Oct. 16, 2001], Units 1 and 2. Retrieved from the Internet <URL: http://technet.oracle.com/doc/oracle8i_816/inter.816/a77132/sdo_intr.htm>.

* cited by examiner

*Primary Examiner*—Jean B Fleurantin
(74) *Attorney, Agent, or Firm*—Barry W. Chapin, Esq.; Chapin IP Law, LLC

(57) ABSTRACT

A geographic data relational database and a spatial library of routines that access and analyze spatial data are used to convert an identified location to a set of geographic coordinate pairs. A geocoder engine applies the spatial library routines to the geographic data in the relational database, and based on the identified location and a set of matching rules, produces the set of geographic coordinates. The geographic data may be derived from multiple sources. The rules may specify, for example, that only geographic coordinates corresponding to an exact match of the identified location are to be returned, or that matching of certain attributes may be relaxed. The identified location may be, for example, the intersection of two streets, an address, a postal area code such as a zip code.

45 Claims, 15 Drawing Sheets

| BUILTUP AREA | |
|---|---|
| BUILTUP_AREA_ID | 14-1 |
| BUILTUP_AREA_NAME | 14-2 |
| ORDER8_ID | 14-3 |
| ORDER1_ID | 14-4 |
| COUNTRY_ID | 14-5 |
| DCA | 14-6 |

FIG. 2

| GC_ORDER1 (states) | |
|---|---|
| ORDER1_ID | 16-1 |
| ORDER1_NAME | 16-2 |
| ORDER1_ABBR | 16-3 |
| COUNTRY_ID | 16-4 |
| DCA | 16-5 |
| GEOMETRY | 16-6 |

FIG. 3

| GC_ORDER8 (counties) | |
|---|---|
| ORDER8_ID | 18-1 |
| ORDER8_NAME | 18-2 |
| ORDER1_ID | 18-3 |
| COUNTRY_ID | 18-4 |
| DCA | 18-5 |

FIG. 4

| GC_POI (points of interest) | |
|---|---|
| POINT_ID | 20-1 |
| NAME | 20-2 |
| FEATURE_CODE | 20-3 |
| FOOD_TYPE | 20-4 |
| ADDRESS | 20-5 |
| BUILDUP_AREA_ID | 20-6 |
| ORDER8_ID | 20-7 |
| ORDER1_ID | 20-8 |
| COUNTRY_ID | 20-9 |
| POSTAL_CODE | 20-10 |
| LINE_ID | 20-11 |
| PERCENT | 20-12 |
| SIDE | 20-13 |
| DCA | 20-14 |
| TELEPHONE_NUMBER | 20-15 |
| POPULATION | 20-16 |
| IMPORTANCE | 20-17 |
| GEOMETRY | 20-18 |

FIG. 5

| GC_POSTAL_CODE | |
|---|---|
| POSTAL_CODE | 22-1 |
| BUILTUP_AREA_NAME | 22-2 |
| ORDER1_NAME | 22-3 |
| DCA | 22-4 |
| CENTER | 22-5 |
| GEOMETRY | 22-6 |
| LINE_ID | 22-7 |

| GC_ROAD | |
|---|---|
| DCA | 24-1 |
| BUILTUP_AREA_ID | 24-2 |
| ORDER8_ID | 24-3 |
| NAME | 24-4 |
| POSTAL_CODE | 24-5 |
| BASE_NAME | 24-6 |
| PREFIX | 24-7 |
| SUFFIX | 24-8 |
| STREET_TYPE | 24-9 |
| GEOMETRY | 24-10 |
| LF | 24-11 |
| RF | 24-12 |
| LSC | 24-13 |
| RSC | 24-14 |
| LS | 24-15 |
| RS | 24-16 |
| LE | 24-17 |
| RE | 24-18 |
| LINE_ID | 24-19 |

| | |
|---|---|
| id | 50-1 |
| matchMode | 50-2 |
| srsName | 50-3 |
| nMultiMatch | 50-4 |
| name | 50-5 |
| street | 50-6 |
| intersectStreet | 50-7 |
| secUnit | 50-8 |
| builtUpArea | 50-9 |
| order8 | 50-10 |
| order2 | 50-11 |
| order1 | 50-12 |
| country | 50-13 |
| postalCode | 50-14 |
| postalAddonCode | 50-15 |
| lastline | 50-16 |
| houseNumber | 50-17 |

| | |
|---|---|
| baseName | 50-18 |
| streetType | 50-19 |
| streetPrefix | 50-20 |
| streetSuffix | 50-21 |
| rangeFrom | 50-22 |
| rangeTo | 50-23 |
| side | 50-24 |
| percent | 50-25 |
| dca | 50-26 |
| edgeId | 50-27 |
| coordinates | 50-28 |
| edgeGeometry | 50-29 |
| matchCode | 50-30 |
| errorMessage | 50-31 |
| matchSequence | 50-32 |
| stringScore | 50-33 |

GeocoderAddress Class

FIG. 10

GEOCODING USING A RELATIONAL DATABASE

BACKGROUND

Geocoding is the process of converting a named location to a set of geographic coordinates. The named location is usually an address such "1 Oracle Drive, Nashua, N.H. 03062" and the coordinates are usually longitude and latitude. Other examples of named locations are places of interest such as "Logan International Airport, Boston" or "Pheasant Lane Mall, Nashua."

A typical geocoder includes a geographic base data source and algorithms that utilize this data source. The data source includes geographic names and street segment information. Geographic names are typically named locations, such as points-of-interest (e.g., names of businesses, shopping complexes, parking garages, government offices), and administrative or political areas (e.g., cities, postal codes, counties, or well known areas such as Midtown Manhattan, Chinatown San Francisco). The street segment information includes data such as the official and alternate street names (e.g., "Main Street", "Daniel Webster Highway", and "Rt. 3", all of which designate the same road), the address number format (e.g., numeric as in "1 Oracle Drive", or alphanumeric as in "256A D W Highway"), address ranges (e.g., odd numbers ranging from 1 through 99 on the left and even numbers ranging from 2-100 on the right), and the geographic coordinates for the end points of the street segment.

The data can also include details of the hierarchy of political or other administrative boundaries. The four-level hierarchy of country, state, county and city, for example, is valid for the U.S. In Europe, some countries have a five-level hierarchy, namely country, province, district, municipality, and settlement.

Different data suppliers (e.g. TeleAtlas, NavTech, and Geographic Data Technologies) have different levels of detail and area of coverage for their respective geographic databases. In addition, each country and sometimes regions within countries have different guidelines for specifying postal addresses. Thus currently available geocoding software is tightly bound to a specific geographic database and its proprietary format. This format typically includes specialized indexes that speed up the search and retrieval of street and places names from the database.

The search process is outlined in the following highly simplified example. To find "500 Oracle Pkwy, Redwood City, Calif.," geocoding software must search a list of state names or abbreviations until it finds "CA". Then, under "CA", it must find the city "Redwood City". Finally it must search through street names until it finds the name "Oracle" and street type "Parkway". The amount of data scanned mandates many highly efficient indexes.

SUMMARY

The traditional approach to geocoding has many drawbacks.

For example, the content rich data is unusable by any other program. Two geocoders cannot share the same data source because each is tightly bound to its proprietary binary data format. Similarly, third party application developers cannot leverage the data either.

Furthermore, data cannot be updated to reflect new changes in real world situations until an entirely new geographic database is generated by the vendor. Also, there is no direct way for anyone other than the data supplier to correct any mistakes in the current data.

In addition, typical geocoder software is unnecessarily complicated because instead of working with a logical structure, the software must work directly off the physical implementation of the data and index structures.

Further still, the data source access is limited by the operating system. For instance, if the operating system only allows thirty-two handles to read a single file at one time, the parallel factor of the geocoder is limited to thirty-two. In an enterprise situation, there might be far more people trying to access this data source at the same moment.

Finally, data management is jeopardized due to possible hardware failures. There is no clean way to ensure the stability of the data beyond what the operating system can provide. Data backup, security and duplication become cumbersome.

Relational database management systems (RDBMSs) are particularly well suited to efficient storage, indexing, and retrieval of large volumes of data. Currently available commercial geocoders, however, do not use an RDBMS for the storage of geographic data that they require. Embodiments of the present invention include a geocoding software solution that can use an RDBMS, such as Oracle Corporation's RDBMS, as its data repository, and that can use a middle-tier component to implement geocoding algorithms.

A particular geocoder of the present invention can include a fully functional geocoding engine capable of address standardization, geocoding, and matching points (POIs) or locations (LOIs) of interest. All of the underlying geographic base and user data such as LOIs, can be stored in a standard Oracle relational database in object-relational format. Thus, combining this data with Oracle Spatial's functionality enables users to perform powerful demographic enhancement and sophisticated spatial analysis.

With Oracle as the backend server and using standard Java technology, application developers can easily built powerful tools using a small set of Java API calls. The Java API includes a single record and batch geocoding interface.

While the example geocoder described herein is U.S.-specific, because of the open data schema and open Java interface, a developer can easily plug in an address parser for other countries to create a global geocoder.

Particular embodiments of the present invention, based on an RDBMS and a mid-tier Java component, can have many benefits, including the following:

Data access may be through a declarative language, such as SQL. Hence, multiple applications may access the same data.

Data updates are also done using SQL. More importantly, the access granularity is a single row in a table.

Because the Oracle8i (tm) database server supports the storage, indexing, and retrieval of spatial data, the complete geographic database can be stored in the RDBMS using the SDO_GEOMETRY SQL data type. This makes it very simple to use the data for multiple purposes.

The data quality can be enhanced by augmenting it from various sources.

One instance of a database server may serve up data to multiple mid-tier geocoder instances. Similarly, a mid-tier geocoder component may connect to one or more instances of a database server to obtain required street or place name information The following additional benefits are a direct result of a specific implementation of geocoding algorithms. The architectural overview and subsequent detailed description of the implementation will elaborate on the reasons for the benefits summarized below.

Separate encoding and implementation of country-specific postal addressing schemes, i.e., the grammar used in parsing an address, and administrative hierarchies. The rules are stored in the database. Thus, this geocoder works for North America, Europe, or any set of countries for which the data and postal addressing rules have been stored in the database.

Country-specific rules are implemented by a specific Java class. Each Geocoder class and the country for which it is responsible is registered with the software. Thus, the geocoder's coverage dynamically increases as additional country-specific geocoder classes are implemented, a distinct benefit over existing implementations, which have a static or fixed coverage. That is, a single interface can be capable of supporting geocoding for all the regions.

According to an embodiment of the present invention, a geographic data relational database and a spatial library of routines that access and analyze spatial data are used to convert an identified location to a set of geographic coordinate pairs. A geocoder engine applies the spatial library routines to the geographic data in the relational database, and based on the identified location and a set of matching rules, produces the set of geographic coordinates.

The geographic data may be derived from multiple sources, and may include, but is not limited to, longtitude and latitude geographic coordinates for endpoints of street segments and postal code area centroids. The relational database may further be used to compute a route or the travel time between two locations, or to generate reports aggregated by geographical area.

The rules may specify, for example, that only geographic coordinates corresponding to an exact match of the identified location are to be returned, or that matching of certain attributes may be relaxed.

The identified location may be, for example, the intersection of two streets, an address, a postal area code such as a zip code.

An embodiment of the present invention utilizes an address structure, i.e., a "GeocoderAddress", having input fields which hold user input information, and output fields which are filled by the geocoder engine. The geocoder engine may also fill in at least one input field for which no information was supplied by the user, and may even replace user-supplied information if it believes that information is incorrect.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a table illustrating the structure of an exemplary built-up area database table.

FIG. 3 is a table illustrating the structure of an exemplary state database table.

FIG. 4 is a table illustrating the structure of an exemplary county database table.

FIG. 5 is a table illustrating the structure of an exemplary points-of-interest database table.

FIG. 6 is a table illustrating the structure of an exemplary postal code database table.

FIG. 7 is a table illustrating the structure of an exemplary road segment database table.

FIG. 10 is a table showing the various fields of the GeocoderAddress class of an embodiment of the present invention.

DETAILED DESCRIPTION

Figure 1:
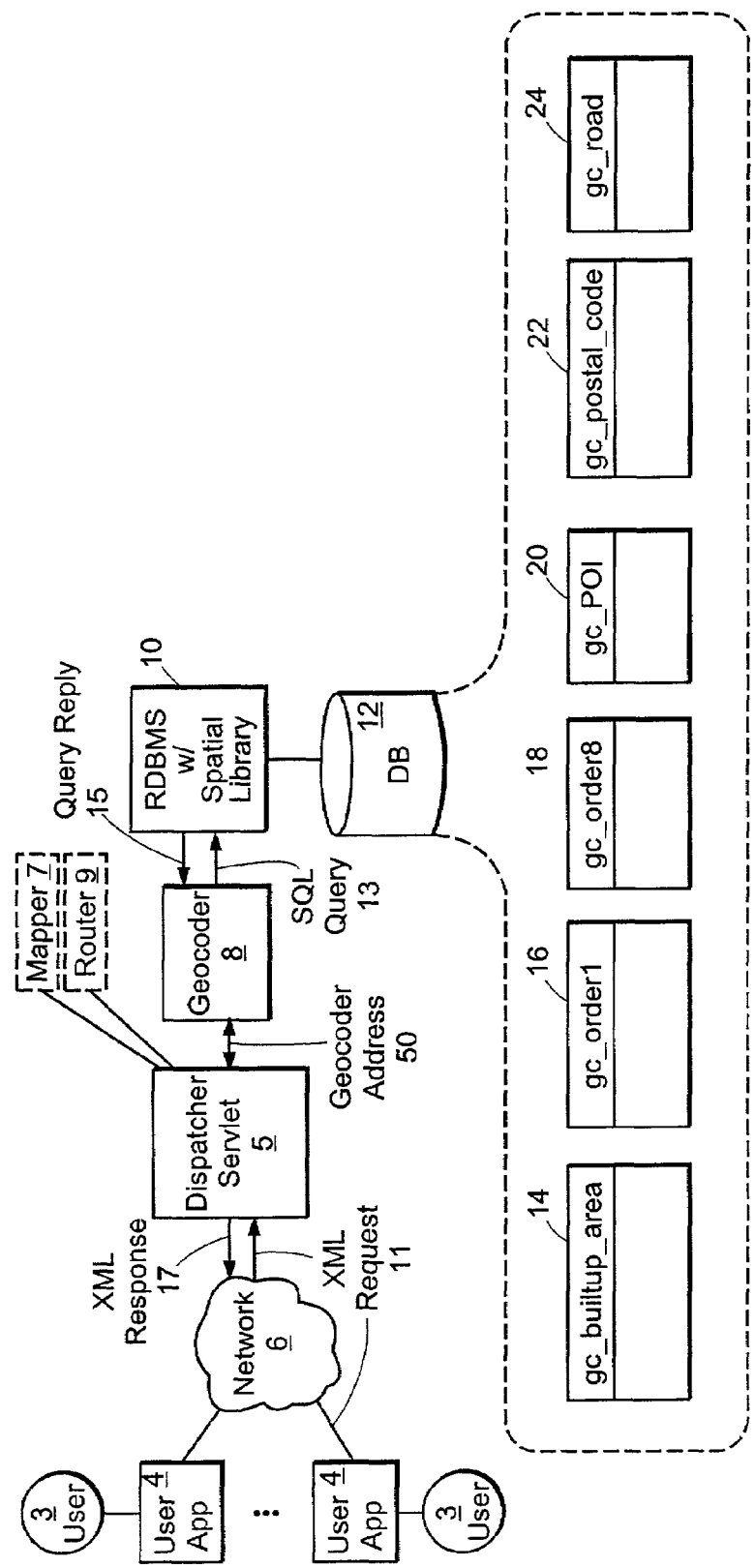
FIG. 1 is a schematic diagram illustrating the flow of data and control within the request/response mechanism of an embodiment of the invention.

FIG. 1 is a schematic diagram 2 illustrating the flow of data and control within the request/response mechanism of an embodiment of the invention.

One or more users 3 may, via user applications 4 such as web browsers, perhaps in conjunction with a Java applet, communicate over a network 6 such as the Internet, to a dispatcher servlet 5.

A user application 4 sends a request, for example formatted as an XML document 11, using HTTP POST, to convert an address or otherwise identified location to geographic coordinates such as latitude and longtitude.

A dispatcher servlet 5 forwards geocoding requests to a geocoder 8, while other types of requests may be forwarded to other applications such as a map rendering tool 7 or route and driving maneuvers computation tool 9. Geocoding requests may also come from these other applications 7, 9. The dispatcher 5 constructs a GeocoderAddress object 50 (FIG. 10) using information included in the XML request, which contains the user-supplied address, including country.

The geocoder 8 may augment or correct the GeocoderAddress 50 by, for example, adding geographical data, i.e., latitude and longtitude, and filling in or correcting street names, postal codes, etc. To accomplish this task, the geocoder 8 constructs one or more database queries 13 and forwards them to a relational database management system (RDBMS) 10 that contains or is supplemented by a spatial library of routines or functions.

The RDBMS 10 in turn retrieves geographic and other data 15 from a geocoding database 12 and returns the data to the geocoder 8. The geocoder 8 then processes the data and returns zero, one or more sets of geographical information (i.e., geocoding results as a list of GeocoderAddress instances) to the dispatcher 5. The dispatcher 5 formats the results data into an XML document 17 and forwards the document 17 to the requesting source, e.g., the requesting user 3.

The database 12 holds various geographical information in several tables. For example, in one embodiment, these tables include a "builtup area" (city) table 14, an order1 (state) table 16, an order8 (county) table 18, a point-of-interest (POI) table 20, a postal code table 22, and a road segment table 24.

The organization of each of these tables is based on the Geographic Data Format (GDF) 3.0 standard, a CEN standard for exchange of transportation data. GDF specifies how geographic data, such as features, attributes and relations, are to be described. For example an administrative hierarchy can have ten levels (order 0 through 9) where level 0 corresponds with country, 1 with state or province, 8 with county or district, and 9 with settlement. Similarly, each entity in a road or transport network has a feature code. A predetermined set of relationships between features also have assigned codes.

This same geographic database 12 may be used by other components, such as mappers 7 and routers 9, that for example, compute routes or drive times between one or more source and destination addresses. Alternatively, a customer relationship management application (not shown) may use the data to generate reports of sales or coupon redemptions aggregated by county.

The data may be obtained from multiple sources. For example, data from vendors that specialize in street network information (e.g., NavTech) can be augmented with data from yellow page providers such as InfoUSA, thereby increasing the number of points-of-interest that the geocoder is aware of from a few thousand to over ten million for the United States alone. Similarly, data from the U.S. Postal Service, Census Bureau, and other state and federal government agencies can easily be blended in to increase efficacy.

In one embodiment of the invention, one instance of a database server may serve up data to multiple mid-tier geocoder instances. Similarly, a mid-tier geocoder component may connect to one or more instances of a database server to obtain required street or place name information. This results in, among other things, increased reliability—if one database is unavailable, another can be used. Another benefit of this organization is the resulting flexibility in data organization—for example, data for North America, Europe, Asia-Pacific, and Latin America may be stored in separate database instances. Yet another benefit is scalability, because multiple geocoders and databases may be used in tandem.

As the remainder of this description is directed to a U.S. Geocoder embodiment, which is responsible for geocoding addresses in the United States, henceforth "state" will be used where the order1 level could be a state, province or other equivalent, and "county" will be used where the order8 level could be a county, district or other equivalent. However, it would be understood by one skilled in the art that the teachings disclosed herein apply as well to embodiments supporting other countries.

FIG. 2 is a table illustrating the structure of an exemplary built-up area table 14, GC_BUILTUP_AREA. A "built-up" area may be, for example, a city or a named area, e.g., Hollywood, Brooklyn, etc.

The BUILTUP_AREA_ID field 14-1 is a unique identifier for the built-up area. The BUILTUP_AREA_NAME field 14-2 holds the name of the built-up area. The ORDER8_ID, ORDER1_ID and COUNTRY_ID fields, respectively 14-3, 14-4 and 14-5, hold identifiers for the corresponding county, state and country, respectively. The DCA field 14-6 holds a corresponding partition key. Table partitioning speeds up query and retrieval time. Therefore, in one embodiment, the U.S. is split into nine predetermined regions, each assigned a unique DCA value.

FIG. 3 is a table illustrating the structure of an exemplary GC_ORDER1 table 16. For the U.S., Order1 corresponds with states.

The ORDER1_ID field 16-1 is a unique identifier for the state. The ORDER1_NAME field 16-2 holds the name of the state, e.g., "New Hampshire." The ORDER1_ABBR field 16-3 holds an abbreviation for the state, e.g., "NH". The COUNTRY_ID field 16-4 and the DCA field 16-5 hold the corresponding country identifier and partition key respectively. The GEOMETRY field 16-6 holds geometric information regarding the state, e.g., a geometric/geographical description of its borders and its centroid.

FIG. 4 is a table illustrating the structure of an exemplary GC_ORDER8 table 18. For the U.S., Order8 corresponds with counties.

The ORDER8_ID field 18-1 is a unique identifier for the county. The ORDER8_NAME field 18-2 holds the name of the county. The ORDER1_ID field 18-3, the COUNTRY_ID field 18-4 and the DCA field 18-5 respectively hold the corresponding state and country identifiers, and partition key.

FIG. 5 is a table illustrating the structure of an exemplary points-of-interest GC_POI table 20. The classification or enumeration of feature codes, food type, and importance levels are all specified by the GDF standard.

The POINT_ID field 20-1 is a unique identifier for the POI. The NAME field 20-2, FEATURE_CODE field 20-3, FOOD_TYPE field 20-4 and ADDRESS field 20-5 respectively hold the name, a feature-related code, a food-type and the address associated with the POI. The BUILTUP_AREA_ID, ORDER8_ID, ORDER1_ID and COUNTRY_ID fields, respectively 20-6 through 20-9, hold identifiers to the corresponding builtup area, state, county and country, respectively. The POSTAL_CODE field 20-10 holds a postal code associated with the POI. The LINE_ID field 20-11 identifies the street segment on which the POI is located. Each street segment has a starting point and an ending point. The PERCENT field 20-12 indicates how far along the street segment the POI is from the starting point. The SIDE field 20-13 indicates whether the POI is on the left or right side of the street segment relative to the starting point. The DCA field 20-14 holds the corresponding partition key.

The TELEPHONE_NUMBER field 20-15 holds a corresponding telephone number. The POPULATION field 20-16 holds demographic population information regarding the POI. The IMPORTANCE field 20-17 holds a relative importance assigned to this POI. Finally, the GEOMETRY field 20-18 holds certain geometric/geographical information about the POI.

FIG. 6 is a table illustrating the structure of an exemplary postal code table, GC_POSTAL_CODE 22.

The POSTAL_CODE field 22-1 holds a postal code. Note that the postal code may not necessarily be unique. For example, there are several zip codes in the United States that cross town boundaries and which therefore encompass more than one town. The BUILTUP_AREA_NAME field 22-2 and ORDER1_NAME field 22-3 respectively hold the names of the associated builtup area and state. The DCA field 22-4 holds the corresponding partition key. The CENTER field 22-5 holds coordinates of the centroid of the area covered by the postal code. The GEOMETRY field 22-6 holds a geometric/geographic description of the area. The LINE_ID field 22-7 identifies a particular street segment which lies close to the centroid specified in the CENTER field 22-5.

FIG. 7 is a table illustrating the structure of an exemplary road segment description table, GC_ROAD 24.

The DCA, BUILTUP_AREA_ID, ORDER8_ID fields, respectively 24-1, 24-2 and 24-3, are the same as those previously discussed with respect to the other tables. The NAME field 24-4 contains the complete name of the street. The POSTAL_CODE field 24-5 contains the postal code in which the segment lies. The BASE_NAME, PREFIX, SUFFIX and STREET_TYPE fields, respectively 24-6 through 24-9, contain the street's base name, prefix, suffix and type respectively, as discussed in the description of the GeocoderAddress object below with reference to FIG. 10.

The GEOMETRY field 24-10 contains a geometric/geographical description of the road, e.g., the positions of its endpoints and its shape.

The LF and RF fields, 24-11, 24-12, describe the house numbering formats, e.g., numeric ("10"), alphanumeric ("10A"), hyphenated ("10-1"), etc., for the left and right sides of the street, respectively. The LSC and RSC fields, 24-13, 24-14, describe the address schemes, e.g., odd/even, for the left and right sides of the street respectively. The LS and RS fields, 24-15, 24-16, indicate the starting house numbers for the left and right sides of the street, respectively. The LE and RE fields, 24-17, 24-18, indicate the ending house numbers for the left and right sides of the street, respectively. These values are used by the geocoder in interpolating the position of a particular address within the street segment.

The LINE_ID field 24-19 is a unique identifier for the street segment described in the record.

Figure 8:
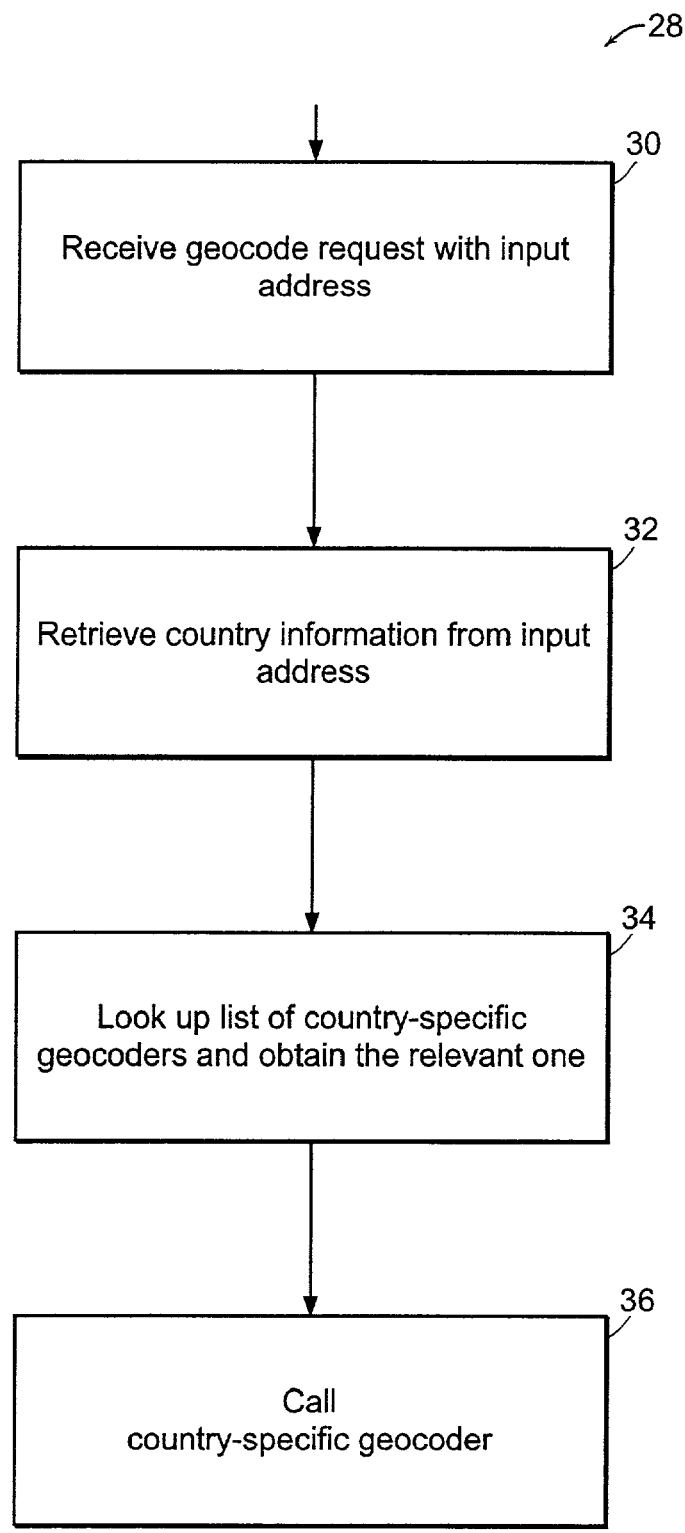
FIG. 8 is a flowchart illustrating the steps taken by an embodiment of the present invention in processing a geocoder request.

FIG. 8 is a flowchart 28 illustrating the steps taken by an embodiment of the present invention in processing a geocoder request.

In step 30, a geocode request containing an input address supplied by a user 3 (FIG. 1) or application 4 is received by the geocoder 8. The input address is formatted into a GeocoderAddress object, described in detail below. The geocoder retrieves country information from the input address (step 32). Using this country information, the geocoder finds the proper country-specific geocoder from a list of country-specific geocoders (step 34), and invokes the proper country-specific geocoder (step 36), passing it the input address.

Figure 9:
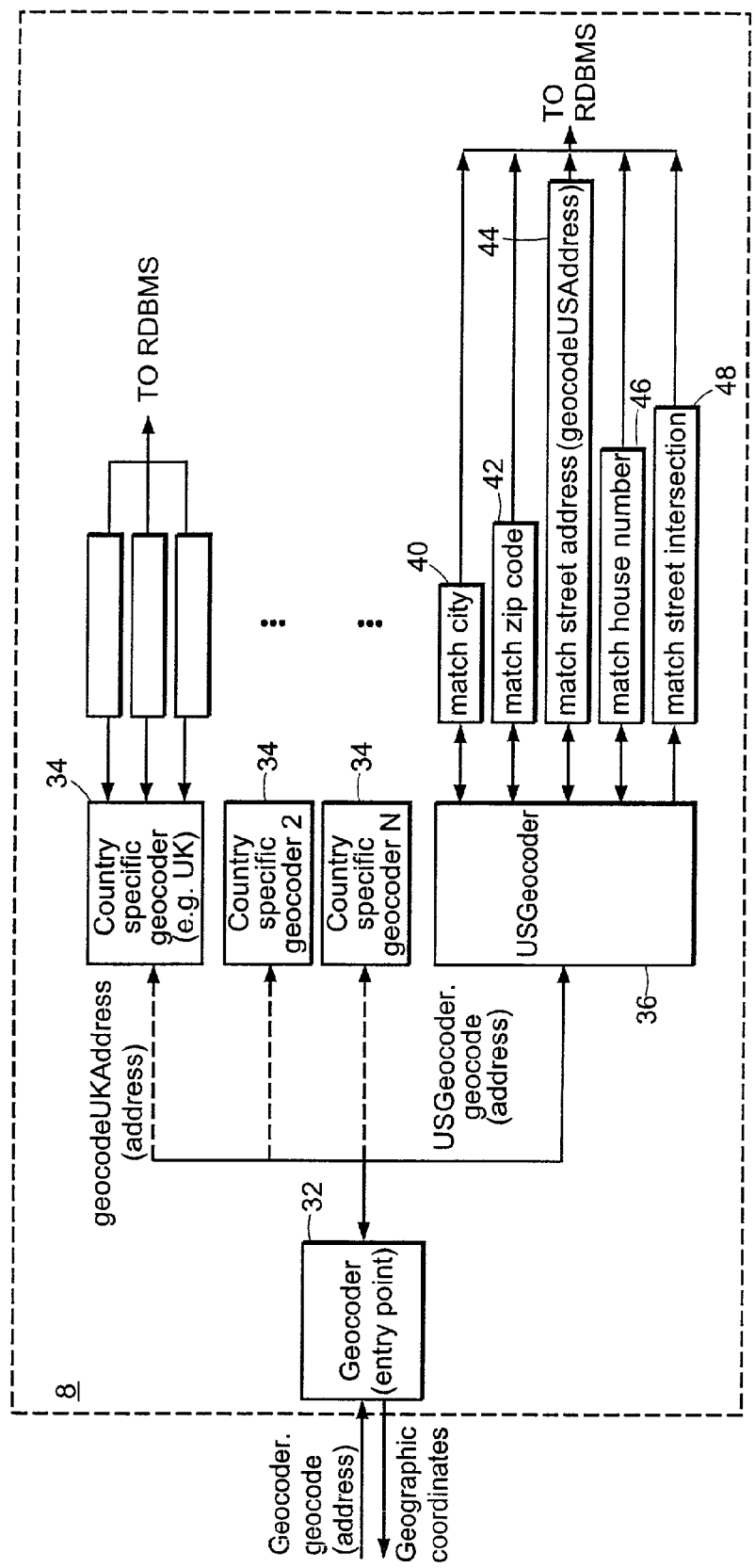
FIG. 9 is a block diagram that further illustrates the geocoding process as performed by an embodiment of the present invention.

FIG. 9 is a block diagram that further illustrates the geocoding process as performed by an embodiment of the present invention.

The geocoder 8 (FIG. 8) is invoked by passing the input address to its interface 32 in a call such as Geocoder.geocode( ). Four country-specific geocoders 34, 36 are shown, although it should be understood that there could be many more. As discussed with respect to FIG. 8, the geocoder determines, based on the country specified in the address, which of the country-specific geocoders to invoke.

Assume for purposes of example that the specified country is the U.S., so that the input address is a U.S. address. Then the U.S.-specific geocoder 36, which implements the Geocoder interface, is invoked by passing the input address to it via a call to USGeocoder.geocode( ).

Each country-specific geocoder 34, 36, when invoked, parses the input address into various components, according to addressing conventions of the specific country, and performs the various SQL queries needed to determine street segments matching the input address.

For example, the USGeocoder 36 may parse the input address into components such as house number, street name, street type, city, state, zip, etc. Depending on which information was supplied by the user, the USGeocoder 36 may use one of several functions 40-48 to retrieve geographical coordinates of matching locations from the database 12 (FIG. 1), according to a set of matching rules, as described below with respect to FIG. 11.

The USGeocoder 36 uses the coordinates of the start and end nodes of the street segment, the geometry (e.g., shape) of the street segment, the range of house numbers for that segment, and the given house number to interpolate the coordinates for the input address along the street segment. The USGeocoder 36 updates and/or populates various fields in the GeocoderAddress object and returns the GeocoderAddress to the geocoder interface 32, which in turn returns the GeocoderAddress to the dispatcher 5 (FIG. 1). The dispatcher 5 may then convert the updated/populated GeocoderAddress to an XML document to return to the user.

The output for a single geocoding operation of the geocoder 8 is a list of zero or more GeocoderAddress objects. To speed up performance and reduce network roundtrips, geocoding requests may also be batched, in which case the output is an array of lists of GeocoderAddress objects.

The GeocoderAddress class contains fields for all of the information necessary for input and output. GeocoderAddress instances may be passed on to other components such as the map engine 7 and routing engine 9.

The GeocoderAddress class is also internationalized based on the GDF standard. Thus, each country-specific geocoder can use the same class for input and output. This class is also dependent on SDOAPI, a Java interface class for Oracle Spatial objects for passing geometries. It is used both as an input to and an output from a geocoding process. That is, a GeocoderAddress object is passed to the geocoder, which fills in the longitude and latitude of the given address, zip code, etc.

FIG. 10 is a table 50 showing the various fields of the GeocoderAddress class of an embodiment of the present invention.

The id field 50-1 holds a unique identifier for the particular GeocoderAddress instance.

The matchMode field 50-2 holds a string which defines, depending on its value, the level of matching to be used in retrieving information from the RDBMS, i.e., whether an exact match is required or whether matching conditions should be relaxed. This is described in more detail below. Upon creation of a new GeocodeAddress instance, this field may be set to "DEFAULT."

The srsName field 50-3 holds a string which specifies the spatial reference system for the coordinates. This is implementation-specific and is not particularly relevant to the invention.

The nMultiMatch field 50-4 indicates the maximum number of multiple matches that may be returned. In one embodiment, the default value is 4.

The name field 50-5 holds the name of a business, landmark, place, or point-of-interest (POI) name, as supplied by the user. A non-null value implies that a POI search is to be performed.

The street field 50-6 holds the street name, as supplied by the user.

The intersectStreet field 50-7 holds the name of an intersecting street as supplied by the user. If provided, the geocoder searches for intersections of the street in this field with the street named in baseName (which is filled in by the geocoder).

The secUnit field 50-8 holds a sectional unit number, e.g., a suite or apartment number.

The builtUpArea field 50-9 generally holds a city or settlement name.

The order8 field 50-10 holds the name of an area, e.g., a county in the U.S., or a municipality in Germany.

The order2 field 50-11 holds the name of a district, or canton, as these are used, for example, in parts of Europe. This field is not typically used for U.S. addresses.

The order1 field 50-12 holds the name of a state in the U.S., or the name of a region or province in other countries.

The country field 50-13 holds the name of a country.

The postalCode field 50-14 holds a postal code, such as a 5-digit U.S. zip code. The postalAddonCode 50-15 holds, for example, the last four digits of a U.S. zip+4 code.

The lastline field 50-16 holds an alternate form for the last line of an address, e.g., "Redwood City, Calif. 94065", as is often used in the United States.

The houseNumber field 50-17 holds the building number of a given address. The baseName field 50-18 holds the base name of a street. For example, "Main" is the base name of "Main Street," while "Street" is the street type. The streetType field 50-19 holds the street type. The streetPrefix field 50-20 holds a street prefix, e.g., "N" in "N Main St". The streetSuffix field 50-21 holds the street suffix, e.g., "NW" in "Mass Ave NW". Note that all of these fields are filled in by the geocoder, either after it parses the address from the "street" field 50-6, supplied by the user, or as the result of a query.

The rangeFrom field 50-22 holds the starting house number for the street segment, e.g., 38 where the range of houses in the segment goes from 38 to 100. Similarly, the rangeTo field 50-23 holds the last house number on the street segment, e.g. 100 where the range extends from 38 to 100.

The side 50-24 field holds either an "L" for left or an "R" for right, indicating on which side of a street, with respect to the street's starting point, a POI or specific address is located.

The percent field 50-25 holds a value which indicates how far along the street segment where the addressed location is.

The dca (or DCA) field 50-26 holds a table partition key. Each street segment is associated with the region it belongs to using the DCA value.

The edgeId field 50-27 holds a street segment identifier.

The coordinates field 50-28, filled in by the geocoder, holds the longitude and latitude for a matching entity (address, intersection, point-of-interest, etc.).

The edgeGeometry field 50-29 holds the geometry of the street segment. That is, it is used to represent the digitized shape of the street segment.

The matchCode field 50-30 indicates the match accuracy, e.g., household, street, postal code, or city, with which a match was made.

The errorMessage field 50-31 holds any error message resulting from a match. It is described in more detail below.

The matchSequence field 50-32 is used in case of an ambiguity, i.e., where multiple results are returned. This can occur, for example, if the provided house number is incorrect, in which case multiple street segments and house number ranges, in descending order of the closeness of their match with the user input, may be returned to the user for further selection. Thus, a sequence number aids in keeping track of each returned result.

The stringScore field 50-33 is used to score "fuzzy" matches of street names. The value stored in the stringScore field 50-33 by the geocoder is based on standard string matching techniques, and represents the "closeness" of the match based on a set of criteria. Examples of such criteria are edit distance (the edit distance between ORANGE and ORACLE is 2 because only 2 characters, NG/CL, need to be changed to convert one string into the other), and SOUNDEX values. This scoring is used when the matchMode field 50-2 holds a value other than EXACT. For example, if matchMode is RELAX_STREET_NAME, then an address such as "1 Orange Dr, Nashua, N.H. 03062" will match the address "1 Oracle Dr, Nashua N.H. 03062."

Figure 11:
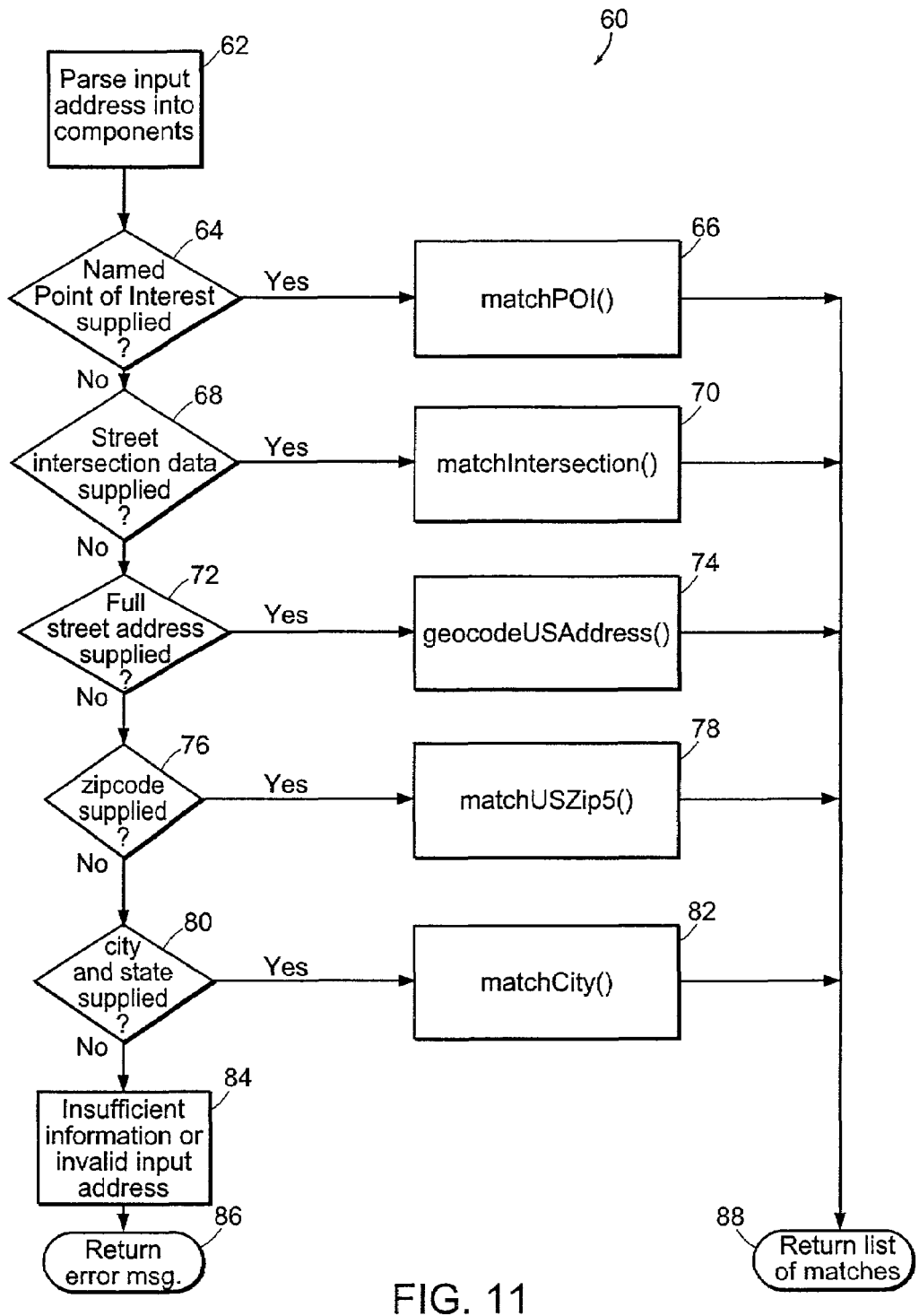
FIG. 11 is a flowchart which illustrates the overall operation of the USGeocoder of FIG. 9 in one embodiment of the invention.

FIG. 11 is a flowchart 60 illustrating the overall operation of the USGeocoder 36 of FIG. 9 in one embodiment of the invention.

First, as described previously, the input address is parsed into individual components (step 62). This includes breaking down the street field 50-6 (FIG. 10) into its individual components and populating the baseName, streetType, streetPrefix and streetSuffix fields 50-18 through 50-21 from the components.

Now, if at step 64, it is determined that the name of a point-of-interest has been supplied, i.e., the name field 50-5 is populated, then the matchPOI( ) function 66 is called.

If, on the other hand, a point of interest has not been supplied, but a street intersection has been supplied as determined at step 68, i.e., the intersectStreet field 50-7 is populated, then the matchIntersection function 70 is called.

If no street intersection information has been supplied, then step 72 determines whether a full street address has been supplied. If so, then a street address match is performed using a call to geocodeUSAddress (step 74).

If a full street address has not been supplied, then step 76 determines whether a zip code or postal code has been supplied. If so, a zip code match is performed at step 78 using a call to matchUSZip5.

If no zip code has been supplied, then step 80 determines whether a city and state have been supplied. If so, matches are found using a call to matchCity (step 82). At step 88, any matches returned by the functions 66, 70, 74, 78, 82 are returned.

On the other hand, if none of the above information is supplied to allow sufficient matching, as determined at step 84, then at step 86 an error message is returned indicating either insufficient information or an invalid input address.

Point of Interest Match

A point-of-interest (POI) match is done by querying one or more database tables using the name of the location as a key. "Empire State Building" and "Yankee Stadium" are examples of points-of-interest.

The user may supply just a name, e.g., "Stanford University"; a name along with a city and state, e.g., "San Francisco International Airport, San Francisco, Calif."; or a name and state, e.g., "Acadia National Park, Maine."

If the user supplies a name with the address record, a POI search is performed. The name is queried using fuzzy logic as described below in the discussion regarding matching street names. While city and state information are optional, specifying one or both can significantly speed up the processing time.

Figure 12:
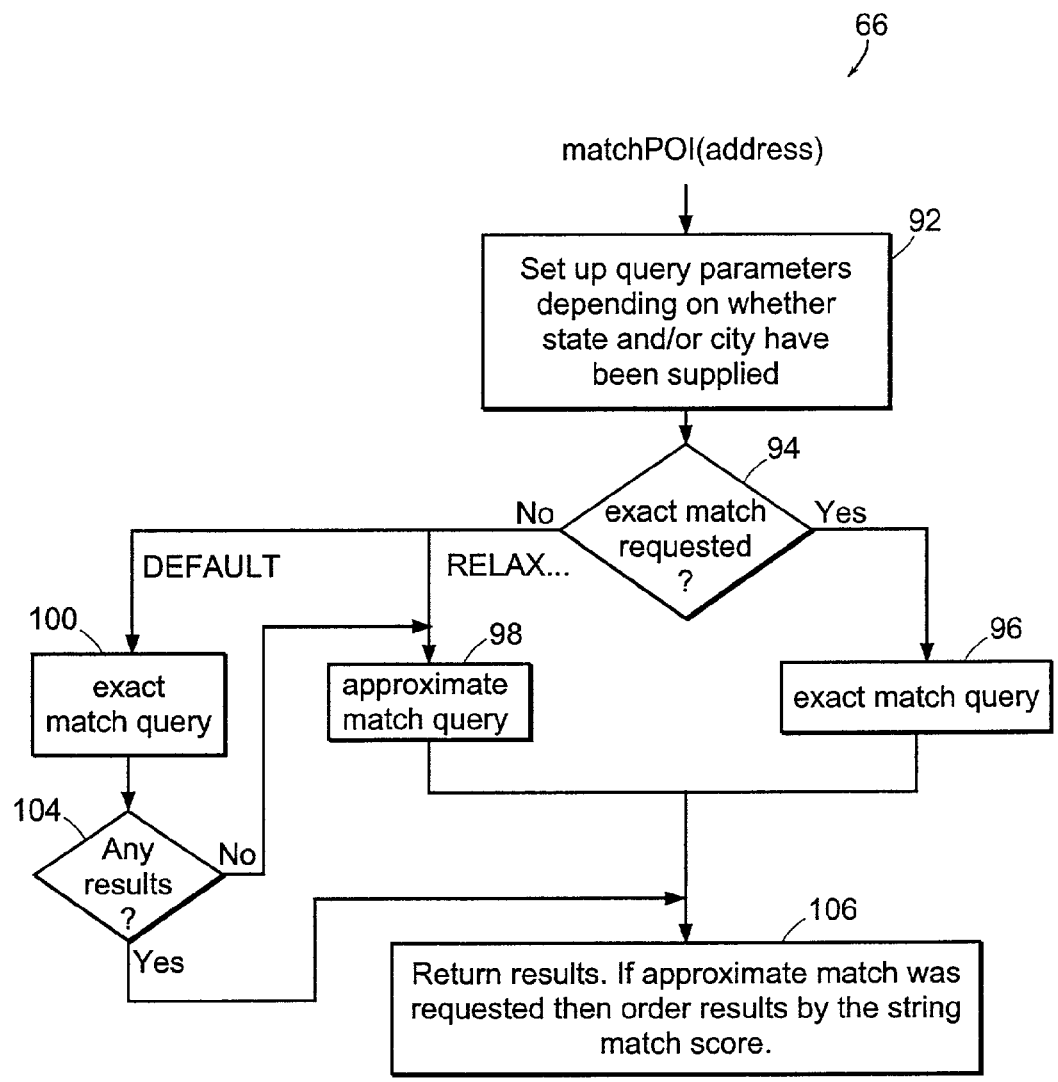
FIG. 12 is a flowchart illustrating the matchPOI algorithm used to match a point-of-interest (POI) to an address.

FIG. 12 is a flowchart illustrating the matchPOI 66 algorithm used to match a point-of-interest (POI) to an address.

First, at step 92, SQL query parameters are set up based on whether city and state are available. If no city and/or state values are specified, then the SQL query has a single WHERE clause predicate for the name. If a city is specified, then a state must also be specified, although the state can be specified without the city. City and state values may then be used in the WHERE clause of the query to further limit the result set of the query.

The names lookup may be performed using an approximate string matching algorithm that returns a string match score. An embodiment of the present invention uses edit distance as the match value. In one embodiment, street names must be within an edit distance of 2 to qualify as a match, while for POI name lookup the limit is 4 (because POI names are often much longer than street names). If the string match for a record is greater than the limit, the record is discarded.

If an exact match is requested, as determined at step 94, then an exact match query is performed (step 96). If a single exact matching record is returned (often the case when the POI name, city, and state are supplied or when the POI is an airport), then the search is done and the result is returned at step 106. If multiple exact matches are found (typically the case for chain restaurants and/or when city and state are not specified), then some or all exact match candidates may be collected in a list and returned to the geocoder in step 106. This list may optimally be returned in one or more batches for the user to choose.

If an exact match is not requested, and if matchMode is set to one of the RELAX modes, then an approximate match query is performed at step 98 according to the specified RELAX matching mode. In step 106, the resulting records may be ordered by string score, and returned to the user in batches.

If the matchMode value is DEFAULT, then an exact match query is performed at step 100. If one or more records are returned, as determined at step 104, the search is complete and the results are returned (step 106). If, on the other hand, no records are returned as a result of the query, then an approximate match is performed 98 and results of that match are returned at step 106.

As an example, the following select statement obtains an airport address, assuming an airport code ("GNV") and the existence of an airport code-to-address translation table (airport_code). The airport_code table is an example of supplemental data that can be used by the geocoder. An airport code is simply an alternate name for a class of POIs.

select name, address, city, state
from airport_code
where code='GNV';

The geographic coordinates of the airport specified as "GNV" can then be obtained by using the returned name and/or address.

Another example illustrates how address and geographical data might be obtained using an exact match query, when only a point-of-interest name, such as "FLEET CENTER," is provided.

```
select
    name, address, builtup_area_id, order8_id, order1_id, postal_code,
    telephone_number, side, percent, line_id, dca, t.geometry.sdo_point.x,
    t.geometry.sdo_point.y
from
    gc_poi t
where
    name like 'FLEET CENTER';
```

Street Intersection Match

If a value is supplied in the GeocoderAddress intersect-Street field 50-7 (FIG. 11), the geocoder of one embodiment of the present invention ignores any house number specified in the house number field 50-17 and tries to find an intersection match between the streets named in the intersect-Street 50-7 and street 50-6 fields.

The output of an intersection match is an exact street address with latitude/longtitude coordinates. The street specified in the street field 50-6 is used as the primary reference, and the house number is that of a house or building located on that street.

During the computation, multiple intersections of the same point may be returned. (Consider the crossroads where there are four corners of matching.) Based on the exact latitude/longtitude coordinates, three of the four corners may be eliminated, based on no particular rule other than first come first serve.

The street segment geometry comes from the GEOMETRY column 24-5 (FIG. 7) of the GC_ROAD table 24. The first coordinate pair in a GEOMETRY is the start node; the last coordinate pair is the end node. Call two street segments Seg1 and Seg2, and their respective start and end points Seg1.Start, Seg1.End, Seg2.Start, and Seg2.End. The street segments intersect if Seg1.Start is the same as either Seg2.Start or Seg2.End, or if Seg1.End is the same as either Seg2.Start or Seg2.End.

Figure 13:
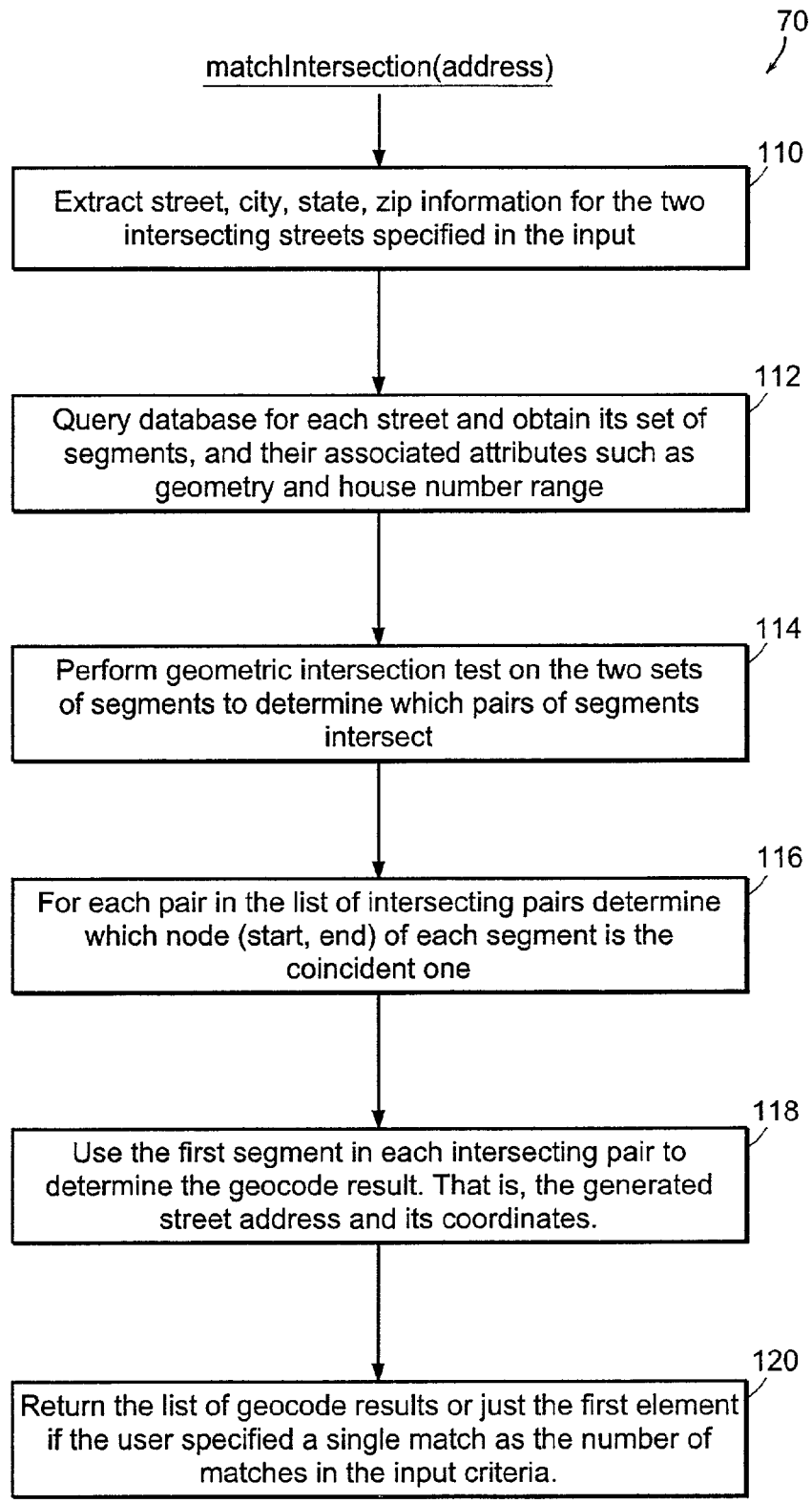
FIG. 13 is a flowchart of the matchIntersection algorithm used to match an intersection to a set of geographic coordinates.

FIG. 13 is a flowchart of the matchIntersection algorithm 70 used to find intersections matching the input data, and returning their respective geographic coordinates.

At step 110, the information for the intersecting streets (street, city, state, zip) is extracted from the input address object and stored. An example of intersecting street information is (Spit Brook Road, Nashua, N.H. 03062) and (Oracle Drive, Nashua N.H. 03062).

For each street, the street segments are queried from the street network database (step 112). This results in two sets of street segments. Associated with each segment is its shape (geometry), house number range, and addressing scheme.

At step 114, a geometric intersection test is performed between these two sets to determine which pairs, if any, touch at some end point. Since all street segments have a shape, and hence an instance of SDO_GEOMETRY, at least one embodiment of the present invention performs the intersection test using the SDO_RELATE operator provided by Oracle Spatial library. This spatial operator tests whether two or more geometries intersect each other. The set of intersecting pairs is stored in a list.

Step 116 determines, for each pair in the list of intersecting pairs, which point (start or end) of each segment in the pair is coincident with the other segment.

For example, finding the coordinates of the street intersection between Spit Brook Road and Oracle Drive in Nashua, N.H. may involve the following three queries. First, the city identifier (builtup_area_id), partition key (dca, described above) and the county identifier (order8_id) are obtained.

```
select
    a.builtup_area_id, a.order8_id, a.dca, a.builtup_area_name,
    c.order8_name
from
    gc_builtup_area a, gc_order1 b, gc_order8 c
where
    a.builtup_area_name = 'NASHUA' and
    a.order1_id = b.order1_id and
    b.order1_abbr = 'NH' and
    a.order8_id=c.order8_id and
    a.dca=b.dca and
    b.dca=c.dca;
```

The above select statement may return, for example, the following data:

BUILTUP_AREA_ID=24137

ORDER8_ID=24115

DCA=7

BUILTUP_AREA_NAME="NASHUA"

ORDER8_NAME="HILLSBOROUGH"

This information can now be used to obtain relevant information for the specified streets. For example, the next select statement retrieves street segments for "Spit Brook," using the BUILTUP_AREA_ID, and DCA values obtained above.

```
select
    line_id, name,base_name,prefix,suffix,street_type,
    postal_code,geometry,lf,rf,lsc,rsc,ls,le,rs,re
from
    gc_road
where
    builtup_area_id=24137 and
    base_name like 'SPIT BROOK' and
    dca=7;
```

Finally, the following third select statement selects the street segments for "Oracle Drive," also using the BUILTUP_AREA_ID and DCA values obtained above.

```
select
    line_id,name,base_name,prefix,suffix,street_type,
    postal_code,geometry,lf,rf,lsc,rsc,ls,le,rs,re
from
    gc_road
where
    builtup_area_id=24137 and
    base_name like 'ORACLE' and
    dca=7;
```

In step 118, for each intersecting pair, the first segment is used to generate the street address corresponding to the intersection. This is done by examining the house number range for the segment. The house number range for a segment specifies the house numbers at the beginning and end of that street segment. If this street segment intersects the other segment at its start point, the starting house number is used. Otherwise, the ending house number is used.

In step 120, results are returned. If there are multiple matches and the user requested a single match, then only the first match may be returned. Otherwise, the entire list of matches may be returned.

Street Address Match (geocodeUSAddress)

Street address matching emcompasses finding the street segments that match the given street name and type, and that are within the given city, state, and postal code. The matching process then determines which of these matching street segments has an address range that includes the house number given in the input street address.

The street address can be input in various formats, but a common method of composing an address is to specify as a pair of address lines or strings. The following describes the expected structure of these two lines.

Some parts of an address are optional. For instance, rather than specifying city and state separately, a "lastline" containing city, state and postal code information may be provided. On the street address line, the user might not enter the house number, or might append secondary unit information (apartment) instead of a house number.

Before matching the street address, the street 50-6 and lastline 50-16 fields are parsed into appropriate separate fields. An embodiment of the present invention assumes that a street contains the following components: [House Number] [Street Prefix] [Base Name] [Street Type] [Street Suffix] [Secondary Unit Designation] [Secondary Unit Number].

Base Name is the only element required. If Secondary Unit Designation requires a number following it, we expect it to follow, such as Apt 717 (as supposed to Front or Rear). The secondary unit designators are not currently used by the geocoder. However, the output address string must contain this information if it is a part of the postal address A lastline may contain the following components: [City] [State] [Postal Code] [Postal Add On Code].

Comma separation is optional, and the state can be specified by full state name or by abbreviation. Postal code is required only when there is incomplete city and state information. Postal add on code is optional.

In addition to the street address, a match mode may be specified in the matchMode field 50-2 that indicates whether an exact or approximate match is desired. The geocoder may perform a matching algorithm based on the matchMode value. The matchMode values and their interpretation are listed below.

EXACT: All fields provided must match exactly;

RELAX_STREET_TYPE: The street type can be different from the official value. For example "PKY", "PKWY", and "Parkway" may be considered equivalent. As another example, any of "Pine Ave", "Pine St", "Pine Dr", "Pine Rd", "Pine Ct", etc. may qualify as match when RELAX_STREET_TYPE is the matching mode.

RELAX_STREET: Variations are allowed on the spelling of a street name. For example, with matchMode set to RELAX_STREET, "Main" matches "Maine."

RELAX_POI_NAME: The point of interest (POI) name does not have to match exactly. A predetermined edit (or string) distance value, as described earlier, is used for an approximate string match.

RELAX_HOUSE_NUMBER: The house number and street type do not have to match. That is, even if the house number is not within any of the ranges associated with the street segments that match the street name, city, state, and postal criteria, records are returned as long as the remaining criteria are met. For example, "800 Oracle Pkwy" may return the center point of Oracle Pkwy, even though the valid building numbers are 100 through 600.

If the user designated the RELAX_BASE_NAME match mode, a string edit distance is calculated for each matched base name, and store in the string_score field in GeocoderAddress class. The edit distance between two strings may be defined as the numbers of characters that must be changed to convert one string to the other. For example the edit distance between ORANGE and ORACLE is 2 because N and G must be changed to C and L. The edit distance between STATE and MAINE is 4, and between MAINE and MAIN it is 1. Other definitions of "edit distance" may be used.

The result is sorted on this score and returned to the user. The matching process may also consider street prefix and suffix when looking for matches. Records that match these attributes are considered to be more accurate than others and are added to the head of the return list. Next, exact street type matches are searched for. Finally, the multiple match list is filled with records with high match scores that do not match prefix, suffix or type.

Approximate string matching is used only when RELAX_BASE_NAME has been specified as the desired match mode.

RELAX_POSTAL_CODE: The postal code (if provided), base name, house number and street type do not have to match. The postal code value obtained through the geocoding process overrides the user-supplied value. For example, "1 Oracle Pky, Nashua, N.H. 03060" will match "1 Oracle Drive, Nashua, N.H. 03062."

RELAX_BUILTUP_AREA: Search the address outside the city specified, but within the same county. The postal code also does not need to match. This is very useful for unincorporated townships. For example, Perris, Calif. is in LA County. Since it is not incorporated (or was not in 1999), its streets are associated with LA County in the street network database.

RELAX_ALL: This is the same as RELAX_BUILTUP_AREA. It exists purely as a convenience. BUILTUP_AREA is a Geographic Data Format (GDF) concept. Users are likely to remember and use RELAX_ALL as a match mode.

DEFAULT: This is generally the same as RELAX_BASE_NAME.

Even when the relax criteria is specified, the geocoder attempts to find the exact match, or the closest match based on the string edit distance (the number of character changes required).

One embodiment of the geocoder can return up to 32 matching records for an input address, ordered by the "goodness" of the matches.

An "error message" is a string indicating how many fields have been matched. Every geocoded result contains this field 50-31. The string may be initialized to "NAV????????281C??" for example.

The first 3 characters indicate the source of the data, for example "NAV" for NavTech. Starting from the 4th position, the remaining indicators are defined as follows.

If the House number matched, then there is a '#' character at position 4.

If the Street prefix matched then there is an E at position 5.

If the Base name matched then there is a B at position 6.

If the Street Suffix matched then there is a U at position 7.

If the Street type matched then there is a T at position 8.

If the Secondary Unit matched then there is a S at position 9.

If the Builtup area matched then there is a B at position 10.

If the Order2 area matched then there is a 2 at position 11.

If the Order8 area matched then there is a 8 at position 12.

If the Order1 area matched then there is a 1 at position 13.

If the Country matched then there is a C at position 14.

If the Postal code matched then there is a P at position 15.

Postal add-on code matched then there is an A at position 16.

A question mark in any position implies that there is no match for the corresponding field. However, if the user does not supply the field, and the field is subsequently filled by the geocoder (e.g., a postal code), the error message indicator is set to match.

With this detailed information, the user 3 or the user's application 4 can decide whether to accept or decline the result.

Figure 14:
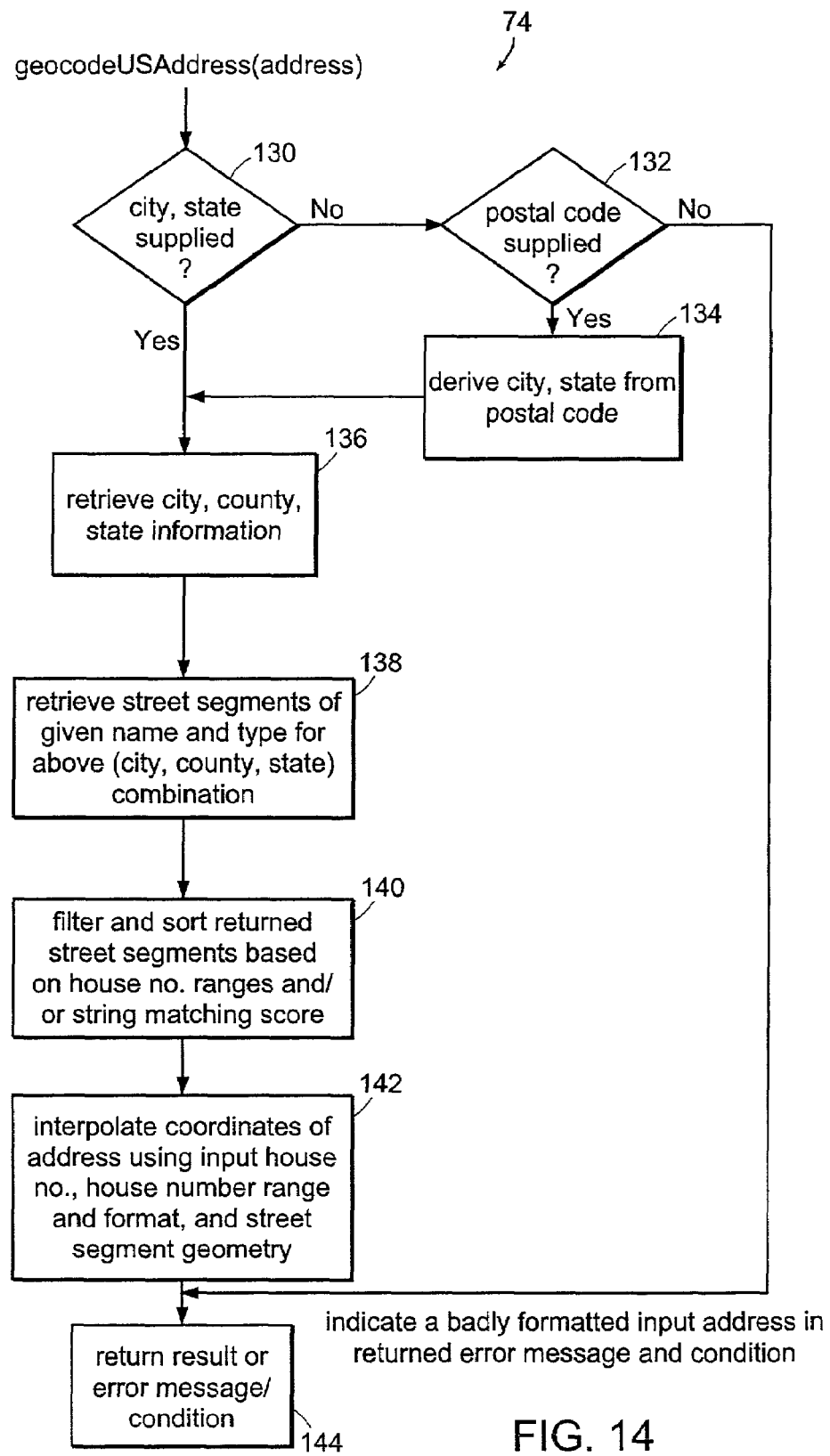
FIG. 14 is a flowchart illustrating the street matching algorithm used to match a street address according to one aspect of the invention.

FIG. 14 is a flowchart illustrating the street matching algorithm 74 used to match a street address according to one aspect of the invention.

If, at step 130, it is determined that a city and state have not been supplied, then the input address is further examined at step 132 to see if a zip code has been supplied. If not, then at step 144, an error message is returned indicating a badly formatted input address. If, on the other hand, step 132 determines that postal code was supplied, then at step 134, the city and state are derived from the postal code.

The geocoder database contains tables for city (builtup_area), county (order8) and state (order1) as administration areas. Each record is assigned a unique identifier (combined with the DCA number). Each admin record contains a parent area identifier to represent the real world administrative hierarchy structure.

Given a {city, state} pair which may have been provided directly by the user/application or which may have been derived from postal code information as in step 134, the geocoder, at step 136, retrieves the corresponding identifiers. Multiple sets of identifiers may be returned. City names can be builtup area names, or named areas, or LLCC (last line common convention) names such as a postal service determines as acceptable alternatives to an official name for a city or settlement. For example, the five boroughs of New York City (Queens, Bronx, etc.) technically are not cities, although they are commonly used in postal addresses instead of New York City. Furthermore, when a user specifies "Boston, Mass.," the user might be referring to the named area, or to the builtup area, which might include surrounding suburbs.

Thus, an array of {city, county, state} triplets is stored as the basis for further street name searches. The street segments data are indexed by their city and county administrative areas.

At step 138, matching street segments within the {City, County, State} are retrieved. The base_name attribute 50-18 in a GeocoderAddress instance is the primary search criteria. This will result in one or more (usually more) {street, city, county, state} tuples being returned from the query.

If the match mode is RELAX_BASE_NAME, then in one embodiment, the above database query is constructed with a constraint that selects all records that match the first three characters of the base_name. That is, the WHERE clause looks something like . . . where base_name like substr(<input_base_name>, 1, 3)||'%' . . .

The number 3 is specified by the geocoder and may be configurable.

Complete records, including street number scheme, ranges, and all official name records, are fetched for further processing. Official name records, although not distinguishable from "unofficial" name records, refer here to the officially designated name of a street within a given administrative area (city or county) when the street has more than one name. For example, Route 3 in Nashua, New Hampshire is officially known in Nashua as Main Street. Similarly, some streets have common use names that are different from their officially designated names, which can happen, for example, when a street has been renamed for some reason.

The given house number is compared to the range associated with each street segment to determine if there is an exact house number match. However, even there is no exact match, these records are kept for close matches.

For each {city, county, state} query, a set of results is obtained, and searched for an exact match. If all information matches what the user provided, the single match result may be returned to the user immediately. If, on the other hand, no exact match is found, all records may be appended to a list for final processing.

This process is repeated until all {city, county, state} sets are queried against the database. These "not exact" matches may be combined into a single list.

However, sometimes a particular query might return an excessive number of records due to a loose "like" constraint. After some number, say 100, of non-exact matches, the geocoder looks only for exact base name matches. Thus, exact solutions are not discarded arbitrarily, and approximate results can be appropriately returned. This ensures the processing speed and not to overflow the memory allocation.

At step 140, matches are scored and ordered by score. Geocoded address values are returned based on the match mode.

If there is any house number match, the corresponding latitude/longtitude information is computed and written to the GeocodeAddress object.

Once a street segment is identified to contain the specified address, a linear interpolation computation (step 142) finds the exact latitude/longtitude coordinates of the location. The computation is based on the percent of the segment the address number falls on.

Percent=abs ((house number−range from)/(range to−range from))

Since the geometry of the street segment is given, the algorithm "walks" along the shape of the street segment until it finds the location in question.

The percent field 50-25 (FIG. 10) in the GeocoderAddress indicates the percent from the beginning end of the street segment. The value −1 indicates that there is no match for the house number.

Address matching involves retrieving city information followed by street information.

For example, the following select statement obtains city information.

```
select
    a.builtup_area_id, a.order8_id, a.dca, a.builtup_area_name,
    c.order8_name
from
    gc_builtup_area a, gc_order1 b, gc_order8 c
where
    a.builtup_area_name = 'NASHUA' and
    a.order1_id = b.order1_id and
    b.order1_abbr = 'NH' and
    a.order8_id = c.order8_id and
    a.dca = b.dca and
    b.dca = c.dca;
```

The next select statements select the street. Note that the street could be in an incorporated or unincorporated area—that is, it could be associated with a city (builtup_area) or a county (order8_area). The following select statement selects the street in an incorporated area:

```
select
    line_id,name,base_name,prefix,suffix,street_type,
    postal_code,geometry,lf,rf,lsc,rsc,ls,le,rs,re
from
    gc_road
where
    builtup_area_id=24137 and
    base_name like 'SPIT BROOK' and
    dca=7;
```

If the street is associated instead with a county rather than a city or town, then the county (order8_id) identifier may be used, rather than the identified builtup area. In this case, illustrated by the following select statement, the id value is 24115 for Hillsborough county. Other details such as lf, rf, lsc, rsc, etc. are retrieved to be used in interpolating the street address along the street segment.

```
select
    a.line_id, a.name, a.base_name, a.prefix, a.suffix, a.street_type,
    a.postal_code, a.geometry, a.lf, a.rf, a.lsc, a.rsc, a.ls, a.le, a.rs, a.re,
    b.builtup_area_name
from
    gc_road a, gc_builtup_area b
where
    a.order8_id = 24115 and
    a.base_name like 'SPIT BROOK' and
    a.builtup_area_id = b.builtup_area_id and
    a.dca = 7 and
    a.dca = b.dca;
```

Postal Code Match

If postal code information is given, and no other information such as street or name of POI is available, USGeocoder performs a postal code match.

Figure 15:
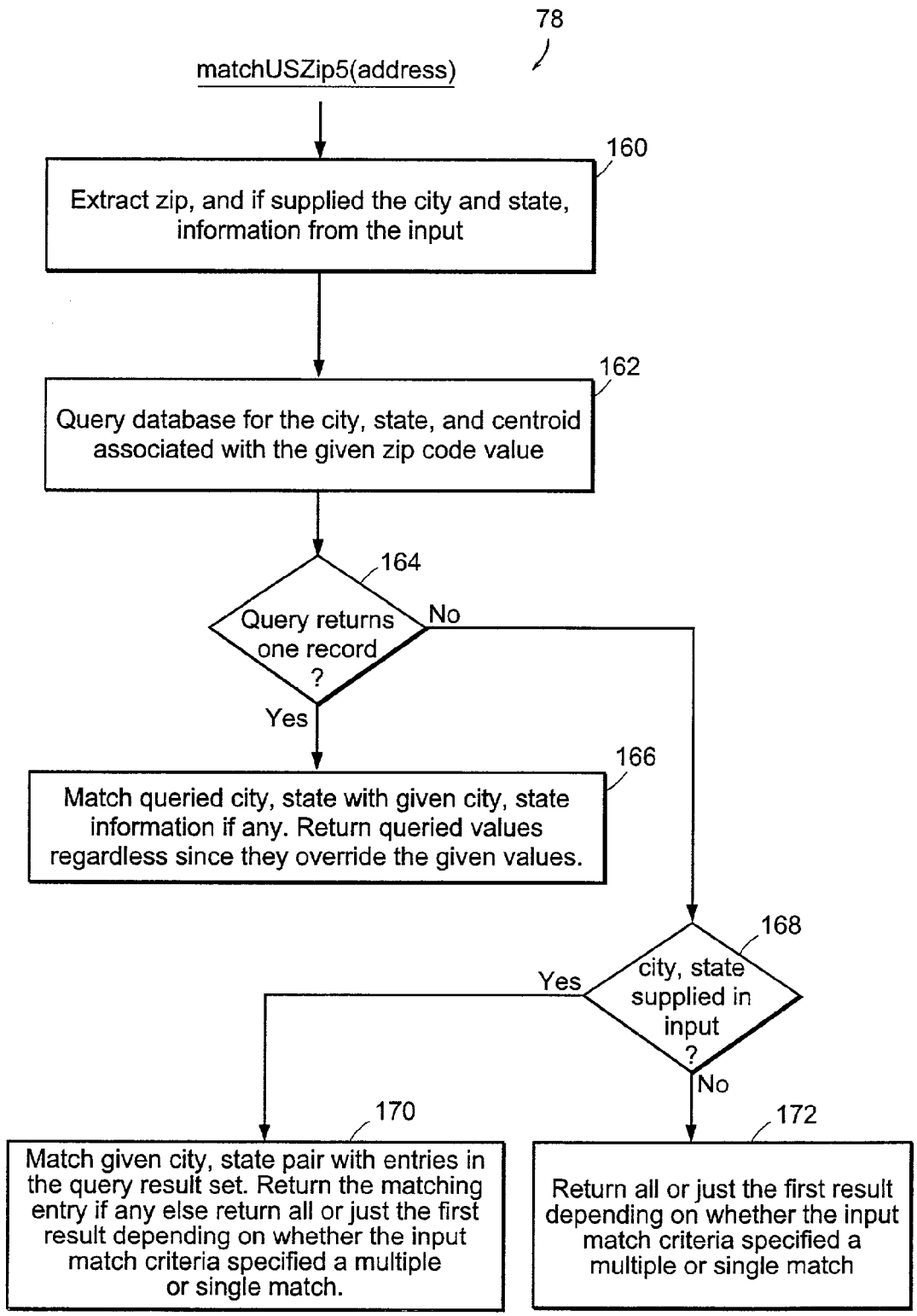
FIG. 15 is a flowchart illustrating how a postal code match is performed.

FIG. 15 is a flowchart illustrating a postal code match algorithm 78 of an embodiment of the present invention.

First, the zip code, and if supplied, the city and state, are extracted from the input (step 160).

Next, the street network database is queried to obtain the city, state, and coordinates of the centroid for the given zip code area (step 162). Such a query might be written, using SQL, as follows:

```
select
    builtup_area_name, order1_name, line_id, dca, t.center.sdo_point.x,
    t.center.sdo_point.y
from
    gc_postal_code t
where
    postal_code = '03062';
```

If at step 164 it is determined that the query result set has a single entry, the results are returned (step 166). If no city or state information was given, then the obtained result is simply returned. Otherwise, if the city and state were supplied in the input address, then the queried and input information are checked to see if they match. If they do not match, the information obtained from the database overrides the supplied data, because it is assumed that the user provided a correct zip code but incorrect city/state information.

If, on the other hand, the query results in multiple records, and if no city and state were given in the input address as determined at step 168, then the result set may be returned as a list (step 172). Otherwise, at step 174, the given city/state pair is compared with city/state pairs in the result set. If there is a match, the matching record is returned. Otherwise, the query result is returned as a list.

Note that although, for the US, the postal code is typically a "zip" code, other codes are used in other countries. Note also that while in these examples, the standard 5-digit zip code is used, the new (extra 4-digit code) could also be used.

City, State Match

If (City, State) information is given, and no other information such as street, a POI, or a zip code, is provided, the USGeocoder 36 may perform a {City, State} match.

Figure 16:
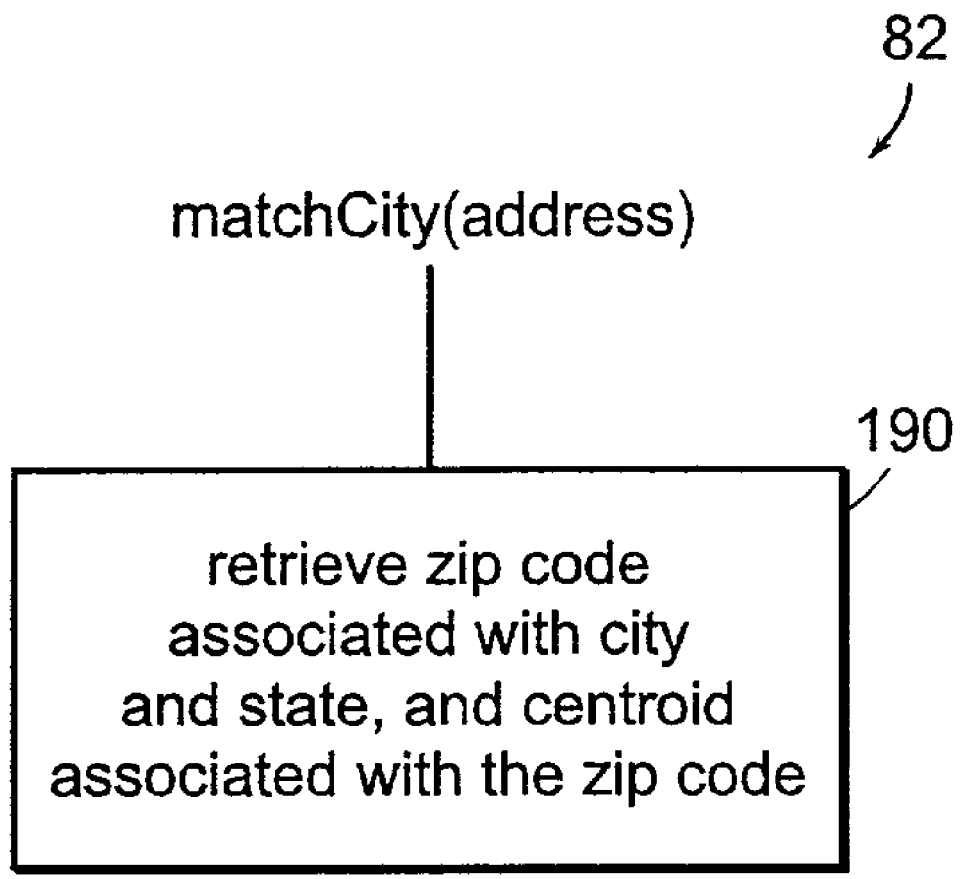
FIG. 16 is a flowchart of the {city, state} matching algorithm of an embodiment of the present invention.

FIG. 16 is a flowchart of the {city, state} matching algorithm 82 of an embodiment of the present invention.

At step 190, an SQL query is issued to the database to find a zip code that is within the city specified. The zip code centroid is pre-snapped to the closest road segment in the database (for routing purpose). The street information is not returned, but the coordinates are. If more than one zip code is returned (for example, large cities have multiple zip codes), then one, e.g., the first one returned, is selected. Alternatively, if the input criteria allow multiple matches, all matches may be returned.

Those of ordinary skill in the art should recognize that methods involved in a geocoding using a relational database may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While this invention has been particularly shown and described with references to particular embodiments thereof, it will be understood by those skilled in the art that various changes in form and details may be made therein without departing from the scope of the invention encompassed by the appended claims.

What is claimed is:

1. A geocoding system for converting a named location to a set of geographic coordinate pairs, comprising:
   a computing processor having a memory device;
      an interface for receiving named location information to be geocoded;
      a relational database containing geographic data;
      a spatial library of routines that access and analyze spatial data;
      a geocoder engine that is configured to access the memory device and, based on execution of code in the memory device, apply at least one of the spatial library of routines to the geographic data in the relational database to calculate a set of geographic coordinates corresponding to the named location information according to a set of matching rules;
      the geocoder engine configured to parse the received named location information and apply a corresponding routine in the spatial library of routines depending on at least one attribute type of location data in the received named location information to convert the named location information to the set of geographic coordinate pairs;
      wherein the geocoder engine is configured to apply the corresponding routine, which includes performance of queries to the relational database to identify street segment information that corresponds to the named location information; and
      wherein the street segment information includes a start node and end node as well as a geometry of a respective street segment, the geocoder engine configured to utilize a building number specified in the named location information to linearly interpolate a position on the geometry of the respective street segment as the set of geographic coordinates.

2. The system of claim 1, wherein the geographic data includes geographic coordinates for endpoints of street segments.

3. The system of claim 1, wherein the geographic data includes geographic coordinates for postal code area centroids.

4. The system of claim 1, wherein geographic coordinates comprise longtitude and latitude values.

5. The system of claim 1, wherein the relational database is further used to compute a route between two locations.

6. The system of claim 1, wherein the relational database is further used to compute travel time between two locations.

7. The system of claim 1, wherein the relational database is further used to generate reports aggregated by geographical area.

8. The system of claim 1, wherein the geographical data is derived from multiple sources.

9. The system of claim 1, wherein the rules specify that only geographic coordinates corresponding to an exact match of the named location information are returned.

10. The system as in claim 9, wherein the first type of information is street intersection data and the second type of information is zip code information.

11. The system of claim 1, wherein the rules specify that geographic coordinates corresponding to relaxed matches of the named location information are returned.

12. The system of claim 1, wherein the named location information comprises at least one of an intersection of two streets, an address, a postal area code, or a business name.

13. The system of claim 1, further comprising;
   an address structure having input fields which hold user input information, and output fields which are filled by the geocoder engine.

14. The system of claim 13, wherein the geocoder engine fills in at least one input field for which no information was supplied by the user.

15. The system of claim 14 wherein a GeocoderAddress class is used to contain input and output information and wherein said GeocoderAddress class is internationalized based on a GDF standard.

16. The system of claim 1, wherein application of the corresponding routine to the named location information produces the set of geographic coordinates corresponding to the named location information.

17. The system as in claim 1, wherein the relational database includes tables of geographic data that the corresponding routine is configured to access in order to produce the set of geographic coordinates, each of the tables including geographic data of a particular attribute type.

18. The system as in claim 17, wherein records in the tables include unique identifiers that enable the geocoder engine to retrieve information from a first table of the tables for a first portion of the named location information and utilize, at least in part, the retrieved information from the first table to identify records in a second table of the tables in furtherance of producing the set of geographic coordinates for the named location information.

19. The system as in claim 1, wherein the geocoder engine is configured to identify a specified country in the named location information in order to thereafter select a corresponding country-specific geocoder routine from the library of spatial routines, the geocoder engine further configured to parse the named location information into components according to the identified country information and perform queries in the relational database via application of the country-specific geocoder routine to produce the set of geographic coordinates corresponding to the named location information.

20. The system as in claim 1, wherein the street segment information includes a building number range of buildings on the respective street segment, a first number in the building number range corresponding to the start node and a second number of the building number range configured to the end node.

21. The system as in claim 1, wherein the geocoder engine is configured to:
identify whether the named location information includes a first type of location data and:
if so, apply a corresponding first spatial routine in the spatial library of routines to the named location to produce the set of geographic coordinates, and
if not, prevent application of the corresponding first spatial routine to the named location information; and
identify whether the named location information includes a second type of location data and:
if so, apply a corresponding second spatial routine in the spatial library of routines to the named location information to produce the set of geographic coordinates, and
if not, prevent application of the corresponding second spatial routine to the named location information.

22. A geocoding method for converting a named location to a set of geographic coordinates, comprising:
receiving named location information;
maintaining a relational database containing geographic data;
parsing the named location information to identify attributes of the named location information;
depending on at least one attribute type of location data in the named location information, applying a corresponding routine in a spatial library of routines to the geographic data in the relational database to calculate a set of geographic coordinates corresponding to the named location information; and
wherein applying the corresponding routine includes performing queries to the relational database to identify street segment information associated with the named location information, the street segment information including a start node and end node as well as a geometry of a respective street segment, the geocoding method further comprising:
utilizing a building number specified in the named location information to linearly interpolate a position on the geometry of the respective street segment as the set of geographic coordinates.

23. The method of claim 22, wherein the geographic data includes geographic coordinates for endpoints of street segments.

24. The method of claim 22, wherein geographic coordinates comprise longitude and latitude values.

25. The method of claim 22, further comprising:
using the relational database to compute travel time between two locations.

26. The method of claim 22, wherein the geographical data is derived from multiple sources.

27. The method of claim 22, wherein the rules specify that only geographic coordinates corresponding to an exact match of the named location information are returned.

28. The method of claim 22, wherein the rules specify that geographic coordinates corresponding to relaxed matches of the named location information are returned.

29. The method of claim 22, wherein the named location information comprises at least one of an intersection of two streets, an address, a postal area code, or a business name.

30. The method of claim 29 further comprising utilizing a GeocoderAddress class to contain input and output information and wherein said GeocoderAddress class is internationalized based on a GDF standard.

31. The method as in claim 22, wherein maintaining the relational database includes maintaining tables of geographic data in the relational database that the corresponding routine accesses in order to produce the set of geographic coordinates, each of the tables including geographic data of a particular attribute type.

32. The method as in claim 31 further comprising:
maintaining records in the tables include unique identifiers that enable the corresponding routine to retrieve information from a first table of the tables for a first portion of the named location information and utilize, at least in part, the retrieved information from the first table to identify records in a second table of the tables in furtherance of producing the set of geographic coordinates for the named location information.

33. The method as in claim 22 further comprising:
identifying a specified country associated with the named location information in order to thereafter select a corresponding country-specific geocoder routine from the library of spatial routines; and
wherein parsing the named location information includes parsing the named location information into components according to the identified country information; and
wherein applying the corresponding routine includes performing queries in the relational database via application of the country-specific geocoder routine to produce the set of geographic coordinates corresponding to the named location information.

34. The method as in claim 22, wherein applying the corresponding routine includes performing queries to the relational database to identify street segment information that corresponds to the named location information.

35. The method as in claim 22, wherein applying the corresponding routine includes performing queries to the relational database to identify street segment information including a building number range of buildings on the respective street segment, a first number in the building number range corresponding to the start node and a second number of the building number range configured to the end node.

36. The method as in claim 22, wherein parsing the named location information includes:
identifying whether the named location information includes a first type of location data and:
if so, apply a corresponding first spatial routine in the spatial library of routines to produce the set of geographic coordinates,
if not, preventing application of the corresponding first spatial routine to the named location information; and
identifying whether the named location information includes a second type of location data and:
if so, apply a corresponding second spatial routine in the spatial library of routines to produce the set of geographic coordinates,
if not, preventing application of the corresponding second spatial routine to the named location information.

37. A geocoding system for converting a named location to a set of geographic coordinates, comprising:
- a computing processor having at least one memory device;
- a geocoder engine having access to the at least one memory device;
- means for receiving named location information;
- means for maintaining a relational database containing geographic data;
- means for parsing the named location information to identify attributes of the named location information; and
- means for applying a corresponding routine in a spatial library of routines to the geographic data in the relational database to calculate a set of geographic coordinates corresponding to the named location depending on at least one attribute type of location data in the named location information;
- wherein means for applying the corresponding routine includes means for performing queries to the relational database to identify street segment information associated with the named location information, the street segment information including a start node and end node as well as a geometry of a respective street segment; and
- means for utilizing a building number specified in the named location information to linearly interpolate a position on the geometry of the respective street segment as the set of geographic coordinates.

38. A computer program product for converting a named location to a set of geographic coordinate pairs, the computer program product comprising a tangible computer-readable storage medium having computer-readable code thereon, including program code for:
- receiving named location information;
- maintaining a relational database containing geographic data;
- parsing the named location information to identify attributes of the named location information; and
- depending on at least one attribute type of location data in the named location information, applying a corresponding routine in a spatial library of routines to the geographic data in the relational database to calculate a set of geographic coordinates corresponding to the named location;
- wherein applying the corresponding routine includes performing queries to the relational database to identify street segment information associated with the named location information, the street segment information including a start node and end node as well as a geometry of a respective street segment; and
- utilizing a building number specified in the named location information to linearly interpolate a position on the geometry of the respective street segment as the set of geographic coordinates.

39. The computer program product of claim 38, wherein the geographic data includes geographic coordinates for endpoints of street segments.

40. The computer program product of claim 38, wherein the geographic data includes geographic coordinates for postal code area centroids.

41. The computer program product of claim 38, wherein the program code further uses the relational database to compute a route between two locations.

42. The computer program product of claim 38, wherein the rules specify that only geographic coordinates corresponding to an exact match of the named information location are returned.

43. The computer program product of claim 38, wherein the rules specify that geographic coordinates corresponding to relaxed matches of the named location information are returned.

44. The computer program product of claim 38, wherein the program code further defines an address structure having input fields which hold user input information, and output fields which are filled by the geocoder engine.

45. The computer program product of claim 44 wherein the geocoder engine fills in at least one input field for which no information was supplied by the user.

* * * * *